Figure 1:
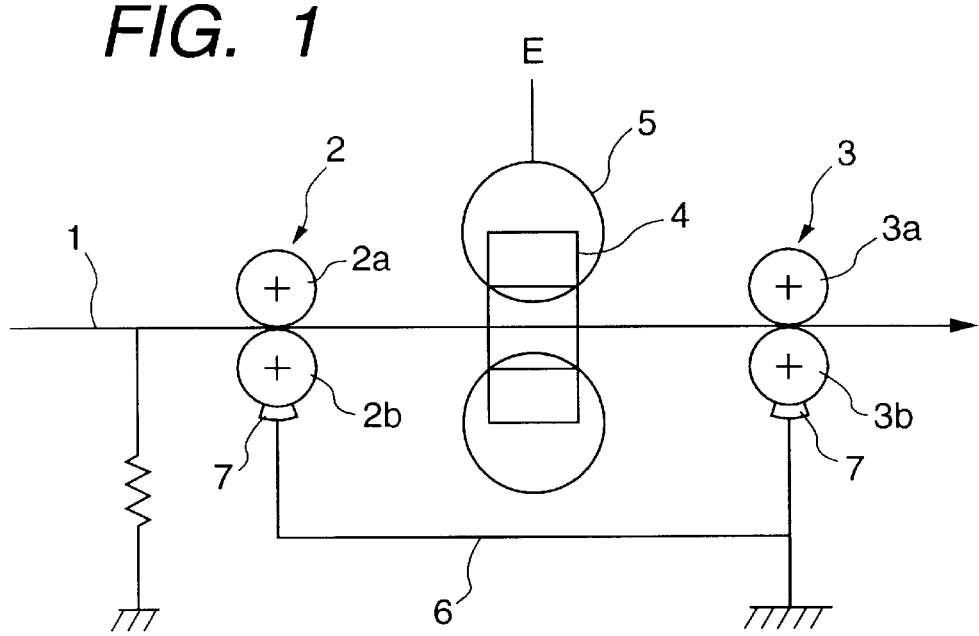

United States Patent [19]
Araki et al.

[11] Patent Number: 5,821,500
[45] Date of Patent: Oct. 13, 1998

[54] PROCESS FOR MANUFACTURING WELDING WIRE

[75] Inventors: Nobuo Araki, Tokyo; Takeji Kagami, Hikari, both of Japan

[73] Assignee: Nippon Steel Welding Products & Engineering Co., Ltd., Tokyo, Japan

[21] Appl. No.: 798,929

[22] Filed: Feb. 11, 1997

[51] Int. Cl.[6] .................................................. B23K 9/24
[52] U.S. Cl. ...................... 219/155; 148/526; 219/145.22
[58] Field of Search .................................. 219/50, 145.1, 219/145.22, 155, 156; 148/526

[56] References Cited

U.S. PATENT DOCUMENTS

| | | | |
|---|---|---|---|
| 4,048,705 | 9/1977 | Blanpain et al. | 219/145.22 |
| 4,987,281 | 1/1991 | Yao | 219/50 |
| 5,008,514 | 4/1991 | Kyriakis | 219/50 |

FOREIGN PATENT DOCUMENTS

| | | |
|---|---|---|
| 0489167 | 6/1992 | European Pat. Off. . |
| 5-81648 | 11/1993 | Japan . |
| 1324651 | 7/1973 | United Kingdom . |

OTHER PUBLICATIONS

Patent Abstracts of Japan, vol. 016, No. 299 (M-1274), 2 Jul. 1992 & JP 04 081297 A (Kawasaki Steel Corp), 13 Mar. 1992 * abstract *.
Patent Abstracts of Japan, vol. 008, No. 258 (M-340), 27 Nov. 1984 & JP 59 130698 A (Shin Nippon Seitetsu KK), 27 Jul. 1984 * abstract *.
Patent Abstracts of Japan, vol. 008, No. 166 (M-314), 2 Aug. 1984 & JP 59 061597 A (Nitsutetsu Yousetsu Kogyo KK), 7 Apr. 1984 * abstract *.
Patent Abstracts of Japan, vol. 007, No. 215 (M-244), 22 Sep. 1983 & JP 58 110195 A (Kobe Seikosho KK), 30 Jun. 1983 * abstract *.
Patent Abstracts of Japan, vol. 005, No. 158 (M-091), 12 Oct. 1981 & JP 56 086699 A (Nippon Steel Corp), 14 Jul. 1981 * abstract *.
Chemical Abstracts+Indexes, vol. 110, No. 10, 6 Mar. 1989, p. 312 XP000017233 Suzuki Tomoyuki et al: "Manufacture of Flux-filled Wires for Arc Welding" & JP 63 203 297 A (Nippon Steel) 23 Aug. 1988, abstract 110:80422s.

*Primary Examiner*—Clifford C. Shaw
*Attorney, Agent, or Firm*—Wenderoth, Lind & Ponack, L.L.P.

[57] ABSTRACT

A process for manufacturing seamless flux-cored welding wires 0.8 to 4 mm in diameter with excellent cracking resistance and primer proof quality and containing very little diffusible hydrogen suited for the welding of high-tensile steels and steel structures subjected to large restraining forces by dehydrogenating by high-temperature heating comprises the steps of heating a straight wire 8 to 15 mm in diameter by direct electric heating through a first and a second pair of roll electrodes spaced 2 to 5 m apart and a ring transformer disposed therebetween to a temperature between 620° and 1100° C., cooling the heated wire to a temperature not higher than 500° C. with a coefficient of heat transfer not higher than 250 $kcal/m^2h°C.$, and drawing to the desired diameter. The welding wire thus obtained a weld containing not more than 5 ml of diffusible hydrogen per 100 g deposited metal.

3 Claims, 7 Drawing Sheets

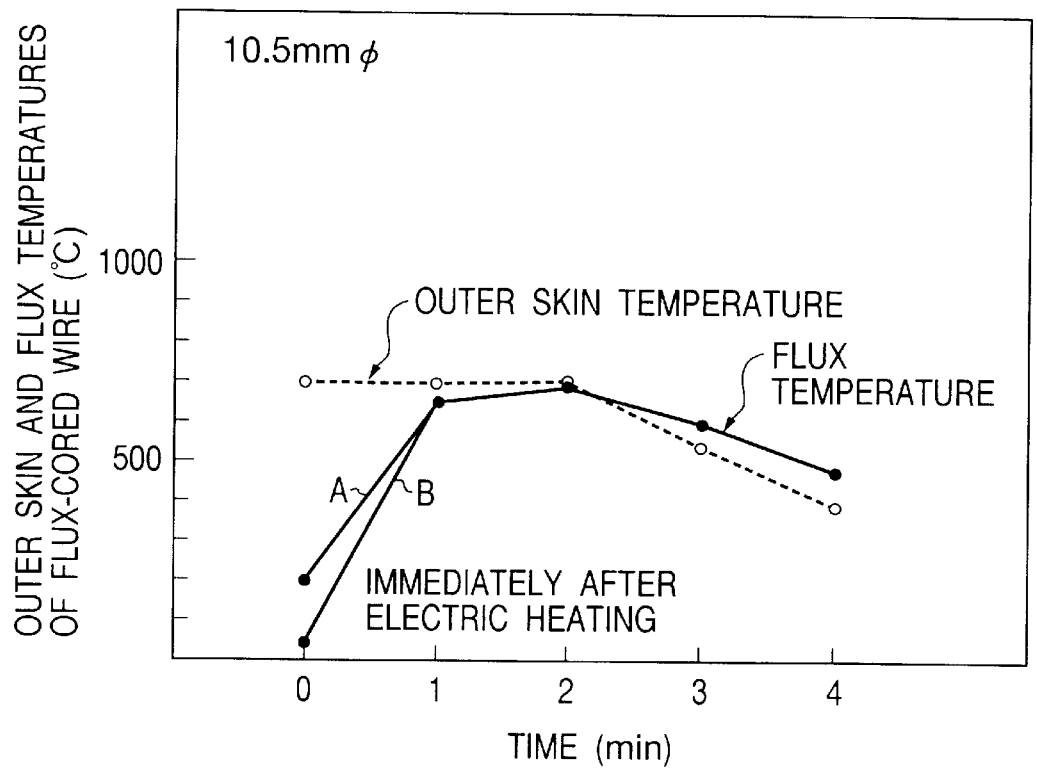
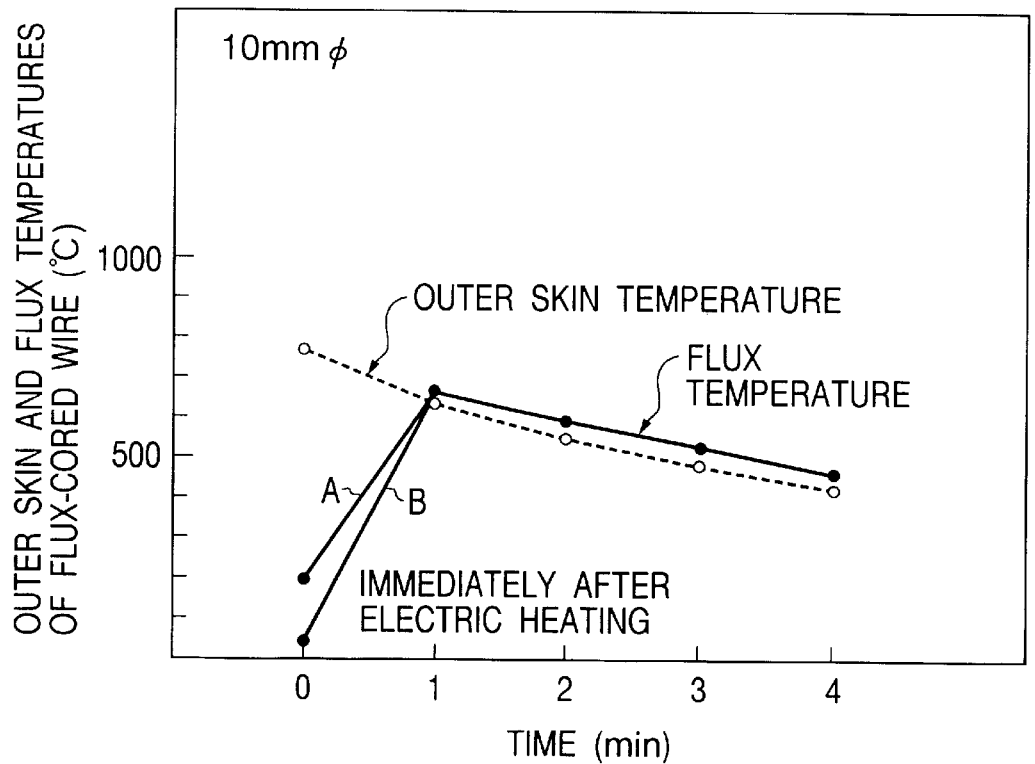

PROCESS FOR MANUFACTURING WELDING WIRE

BACKGROUND

This invention relates to a process for manufacturing flux-cored welding wire for low-hydrogen welding having superior resistance to cracking and primer-proof quality suited for use in the welding of high-tensile steels and other high-grade steels and steel structures subjected to large restraining forces.

Dehydrogenation in the manufacturing process of seamless flux-cored welding wires has conventionally been carried out by heating to 600° to 800° C. in a bell or tunnel furnace flux-cored wires drawn from pipes with a diameter of 10 to 13 mm down to pipes with a diameter of 2 to 4 mm. Dehydrogenation under heat has been applied on wires with small diameters of 2 to 4 mm for the following reasons: (1) There have been no efficient heating dehydrogenating process for large-diameter wires; and (2) Small-diameter wires can be easily formed into coils or loops that are required for shortening the overall length of bell or tunnel furnaces.

In addition, the hardness of the outer skin must be controlled to meet the packing ratio and other specifications of individual flux-cored wires to insure good feed efficiency of welding wires varying from 0.8 to 4 mm in diameter during automatic welding and prevent the breaking of wires during manufacture. Thus, the diameter of wires to be heated must be determined by considering the work hardening of the outer skin that occurs when wires are drawn after softening annealing. As such, a single heat has been applied to serve two different purposes, i.e., dehydrogenation and the softening of the outer skin. Furthermore, the commonly used bell and tunnel furnaces are not completely satisfactory because productivity of bell furnaces is low and thermal efficiency of tunnel furnaces is low, the material, structure and service life of tunnel furnaces do not permit use at temperatures higher than 800° C., and they require large space for installation.

As automatic welding has become popular, the use of solid wires, flux-cored wires also has increased, with flux-cored wires having a seamed outer skin constituting the mainstream. Generating approximately 7 ml of diffusible hydrogen for 100 g deposited metal, such wires have an undesirable tendency to form hydrogen-induced cracks in the welds of high-strength steels or in steel structures subjected to large restraining forces. When used for welding primer-coated steel plates, welding wires containing much hydrogen have a tendency to form gas grooves, pits and other weld defects, too.

The reasons why it is difficult to manufacture low-hydrogen welding wires with seamed outer skin are as follows: (1) Packed flux contains adhesive moisture; (2) Water of crystallization cannot be removed from some minerals contained in packed flux unless heated to 500° C. or above; (3) Some metal powders contained in packed flux contain hydrogen that cannot be removed unless heated to 300° C. or above; (4) When heated to a high temperature, oxygen admitted through the seam in the outer skin causes quality deterioration of the packed flux by accelerating oxidation; and (5) Moistening through the seam in the outer skin does not permit the manufacture of low-hydrogen flux-cored welding wires.

Therefore, seamless flux-cored welding wires were developed to permit the manufacture of low-hydrogen flux-cored welding wires. Low-hydrogen flux-cored welding wires of this type are manufactured by packing flux in a steel tube. The packed tube is heated to a temperature between 600° and 800° C. for dehydrogenation. The water in the packed flux is changed into atomic hydrogen by the chemical reaction given below and diffused through the outer skin.

$$Me + H_2O \rightarrow MeO + H_2$$

where Me: Deoxidizer and other metallic components in the flux and the inner wall of the outer skin $H_2O$=Water in the packed flux To decrease water and other sources of hydrogen (potential hydrogen), wires must be heated to higher temperatures. To attain good feeding of wires, on the other hand, the outer skin softening annealing condition must be properly controlled. However, the conventional process with single heating does not provide welding wires with satisfactorily dehydrogenated flux and satisfactorily softened outer skin. Application of stronger dehydrogenation results in over-softening of the outer skin that can impair the feed of welding wire during welding, depending on the size of the wire. Application of softening annealing at somewhat lower temperatures to wires with outer skin of proper hardness results in insufficient dehydrogenation, increases the quantity of diffusible hydrogen, and decreases the resistance of the weld metal to cracking. The conventional heating process does not meet the increasing demand for welding wires of lower hydrogen contents and for higher wire feed speeds.

SUMMARY

To solve the problems described above, the inventors provide a new process for manufacturing welding wires that permits stronger dehydrogenation and provides optimum wire feed speed by applying optimum heating in two processes, instead of the conventional single heating, of dehydrogenation heating and outer-skin-softening heating. The main features of the invention are as follows:

(1) A process for manufacturing seamless flux-cored welding wire with dehydrogenation by high-temperature heating comprising the steps of directly and electrically heating, at a temperature between 620° and 1100° C., a straight wire, which is a metal tube filled with flux and has a diameter of 8 to 15 mm, by passing the wire through pairs of the first and second roll electrodes spaced 2 to 5 m apart along the path of wire travel and an opening in a ring transformer disposed between the two pairs of roll electrodes, cooling the heated wire to 500° C. or below with a coefficient of heat transfer of 250 kcal/m²h° C. or below, and drawing the cooled wire to a diameter between 0.8 and 4 mm. The weld made by welding with the seamless flux-cored welding wire thus obtained contains not more than 5 ml of diffusible hydrogen in 100 g deposited metal.

(2) A process for manufacturing seamless flux-cored welding wire with dehydrogenation by high-temperature heating comprising the steps of directly and electrically heating, at a temperature between 620° and 1100° C., a straight wire, which is a metal tube filled with flux and has a diameter of 8 to 15 mm, by passing the wire through pairs of the first and second roll electrodes spaced 2 to 5 m apart along the path of wire travel and an opening in a ring transformer disposed between the two pairs of roll electrodes, heating the preheated wire to a temperature between 600° and 800° C. in a gas or electrically heated furnace, cooling the heated wire to 500° C. or below with a coefficient of heat transfer of 250 kcal/m²h°C. or below, and drawing the cooled wire to a diameter between 0.8 and 4 mm. The weld made by welding with the seamless flux-cored welding wire thus obtained contains not more than 5 ml of diffusible hydrogen in 100 g deposited metal.

(3) A process for manufacturing seamless flux-cored welding wire with dehydrogenation by high-temperature heating comprising the steps of directly and electrically heating, at a temperature between 620° and 1100° C., a straight wire, which is a metal tube filled with flux and has a diameter of 8 to 15 mm, by passing the wire through pairs of the first and second roll electrodes spaced 2 to 5 m apart along the path of wire travel and an opening in a ring transformer disposed between the two pairs of roll electrodes, cooling the heated wire to 500° C. or below with a coefficient of heat transfer of 250 kcal/m$^2$h°C. or below, drawing the cooled wire to a diameter between 2 and 7 mm, heating the drawn wire to a temperature between 600° and 800° C. in a gas or electrically heated furnace, cooling the heated wire to 500° C. or below with a coefficient of heat transfer of 250 kcal/m$^2$h°C. or below, and drawing the cooled wire to a diameter between 0.8 and 4 mm. The weld made by welding with the seamless flux-cored welding wire thus obtained contains not more than 3 ml of diffusible hydrogen in 100 g deposited metal.

The processes according to this invention described above permit manufacturing a flux-cored welding wire 0.8 to 4 mm in diameter by simply drawing a wire with a diameter of 8 to 15 mm after dehydrogenating the flux and softening the outer skin. Seamless flux-cored welding wire containing not more than 5 ml per 100 g deposited metal can be obtained by directly and electrically heating straight seamless flux-cored wire 8 to 15 mm in diameter in an in-line continuous process without generating sparks and cooing the heated wire to 500° C. or below with a coefficient of heat transfer of 250 kcal/m$^2$h°C. or below. The wires dehydrogenated with a diameter of 8 to 12 mm are then drawn to seamless flux-cored welding wires 2 to 4 mm in diameter with the hardness of the outer skin thereof controlled to a Vickers hardness of 180 to 250 Hv. When the raw wire diameter is limited between approximately 8 and 10 mm, seamless flux-cored wires 0.8 to 1.6 mm in diameter, with the hardness of the outer skin controlled to a Vickers hardness of 200 to 250 Hv, can be obtained. Furthermore, the diameter of the raw wire to be heat-treated and the hardness of the finished welding wire can be selected from a wider range depending on the chemical composition of the steel strip from which the raw tube is manufactured.

Ultra-low hydrogen welding wires can be manufactured by applying dehydrogenation and outer-skin softening heat treatments on raw wires with a diameter between 8 and 15 mm and drawn wires with a diameter between 2 and 7 mm. First, raw wires having a diameter between 8 and 15 mm are dehydrogenated by direct electric heating. Then, the wires drawn to 2 to 7 mm in diameter are heated in a continuous gas or electric heating furnace for outer-skin softening and dehydrogenation. The products thus obtained are ultra-low hydrogen flux-cored welding wires containing not more than 3 ml of diffusible hydrogen per 100 g deposited metal, with the hardness of the outer skin controlled to a Vickers hardness of 150 to 250 Hv.

The processes according to this invention eliminates the need for pre-baking the packed flux. Even fluxes containing much water do not require pre-baking or other intense drying. With a dehydrogenation applied on raw tubes 8 to 15 mm in diameter and an additional dehydrogenation on tubes drawn to a diameter of 2 to 7 mm, ultra-low hydrogen flux-cored welding wires containing not more than 3 ml of diffusible hydrogen per 100 g deposited metal can be obtained without any such pre-packing intense drying.

The processes of this invention also eliminates the inconvenience conventionally experienced in the adjustment of flux materials containing water of crystallization or hydrogen. Dehydrogenation at a temperature of 1100° C. maximum applied on wires with a diameter between 8 and 15 mm and subsequent dehydrogenation on wires drawn to 2 to 7 mm in diameter, in combination, permit manufacturing ultra-low hydrogen flux-cored welding wires containing not more than 3 ml of diffusible hydrogen per 100 g deposited metal without adjusting the water of crystallization or hydrogen contained in the packed flux.

Furthermore, application of dehydrogenation heating and outer-skin softening heating in separate steps permits selecting optimum conditions for each heating. Application of optimum heating for dehydrogenation and outer-skin softening in separate steps assures increased dehydrogenation and stable wire feed under severe bending conditions of flexible conduits during welding. As is obvious from the above, the processes according to this invention offer many industrial advantages.

DRAWINGS

FIG. 1 illustrates the principle of direct electric heating applied to a wire passed through a ring transformer according to this invention.

Figure 2:
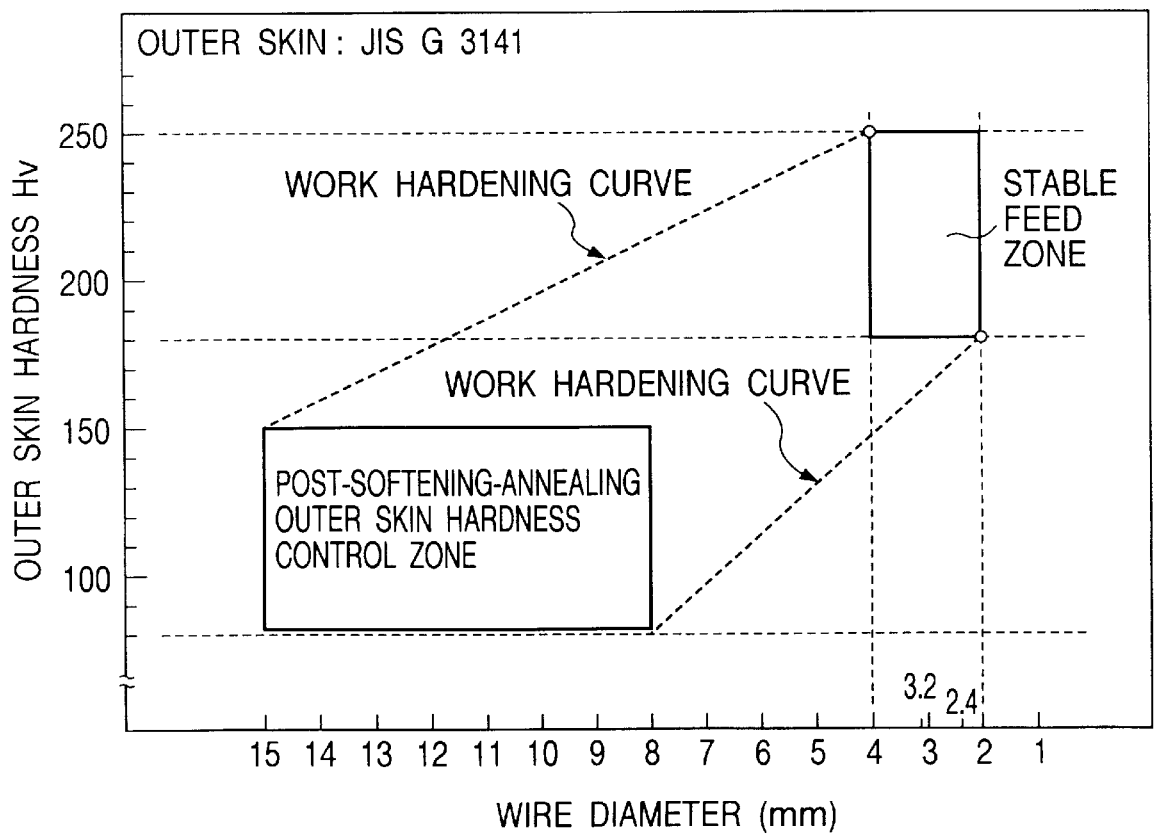

FIG. 2 diagrammatically shows the relationship between the outer-skin hardness control zone and the hardness of the outer skin of wires 8 to 15 mm in diameter after softening annealing.

Figure 3:
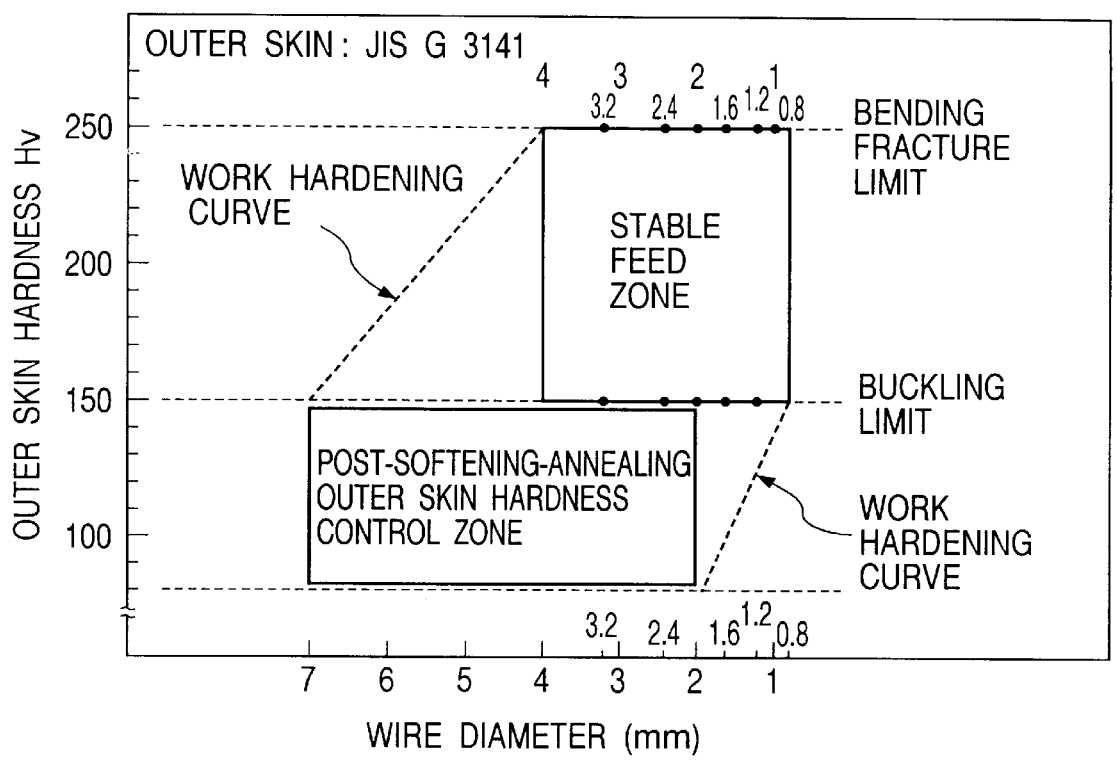

FIG. 3 diagrammatically shows the relationship between the outer-skin hardness control zone and the hardness of the outer skin of heated and drawn wires 2 to 7 mm in diameter after softening annealing.

Figure 4:
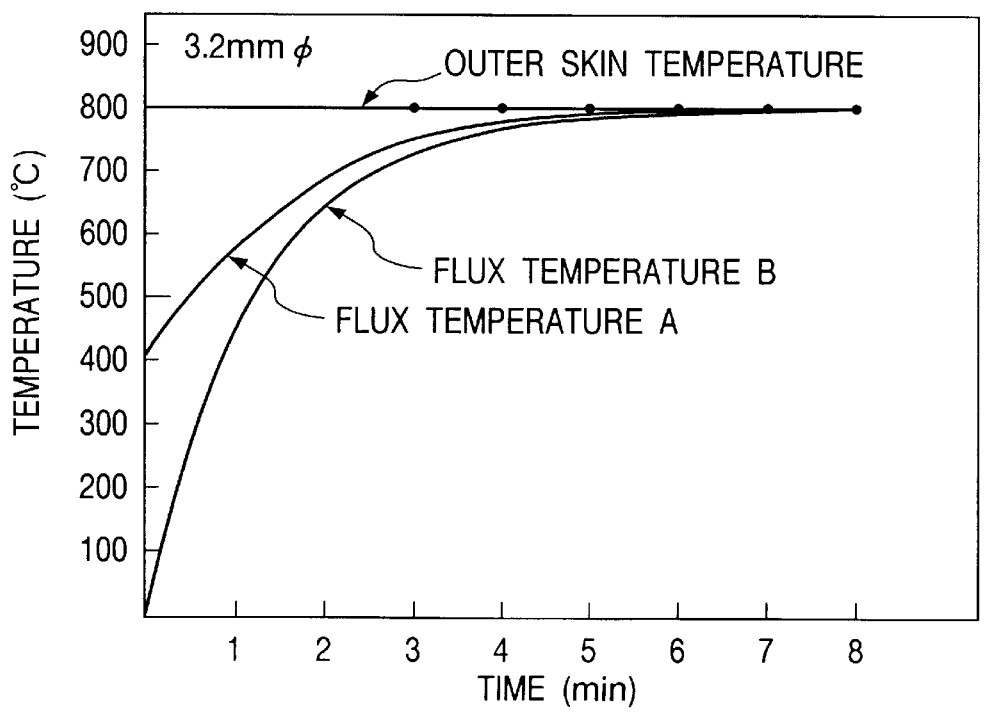

FIG. 4 graphically shows the relationship between the heating time and temperature in a combination of direct electric heating and heating in a tunnel furnace.

Figure 5:
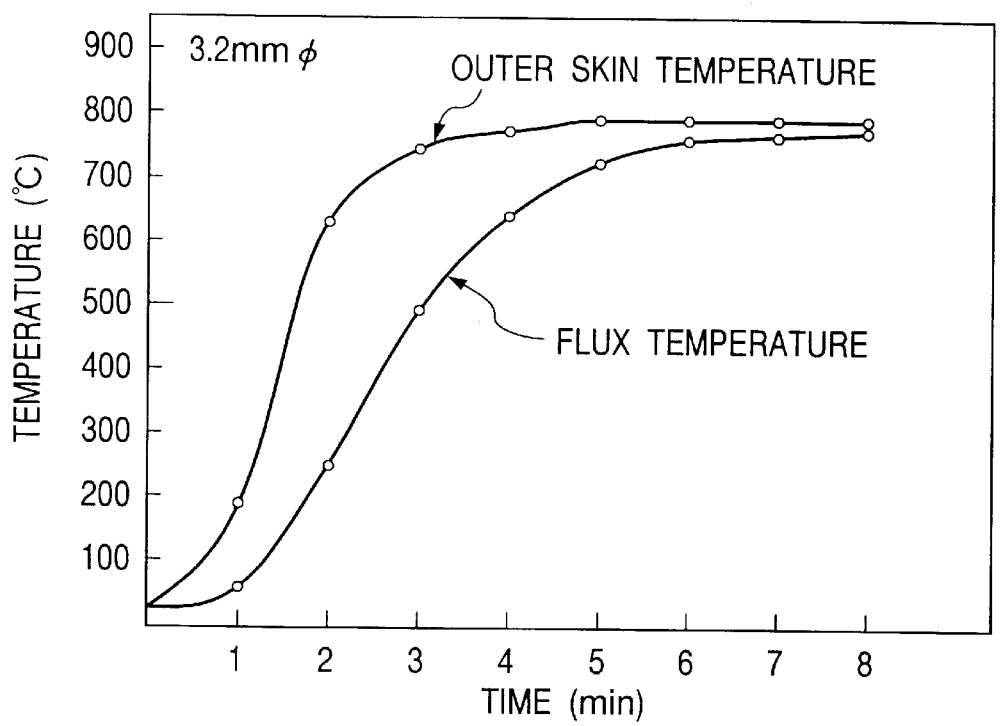

FIG. 5 graphically shows the relationship between the heating time and temperature in heating in a continuous tunnel furnace.

Figure 6:
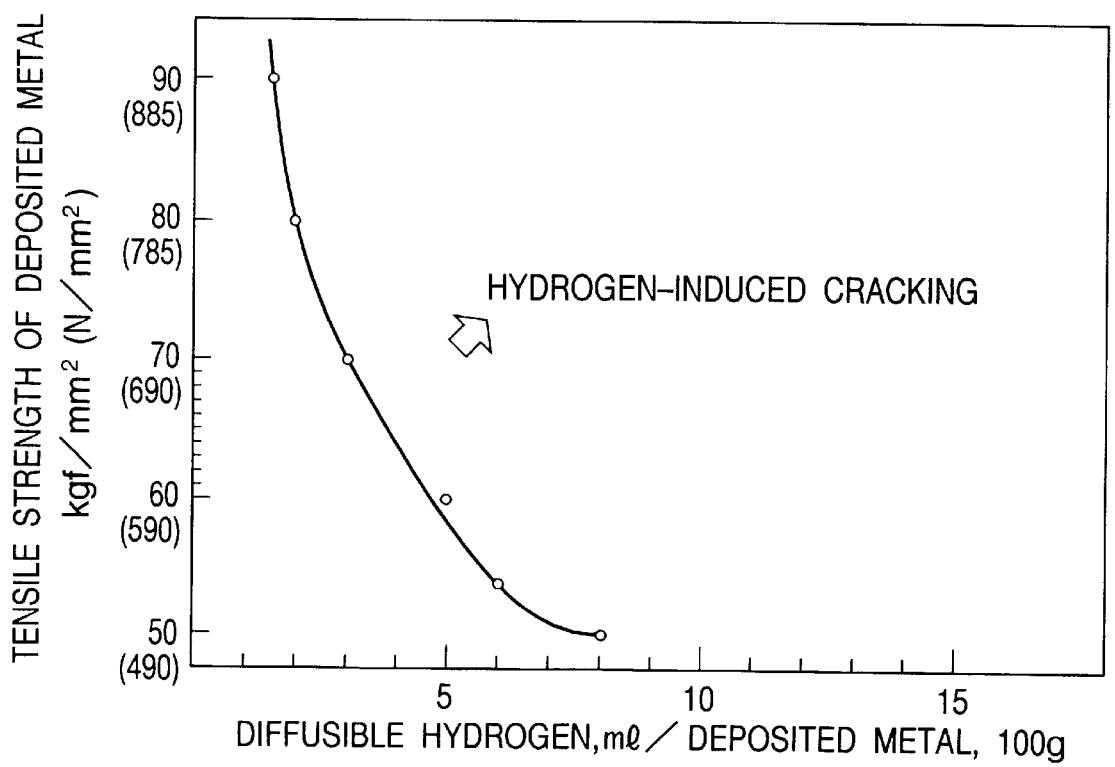

FIG. 6 graphically shows the relationship between the amount of diffusible hydrogen and the incidence of hydrogen-induced cracking in horizontal-position and fillet welding.

Figure 7:
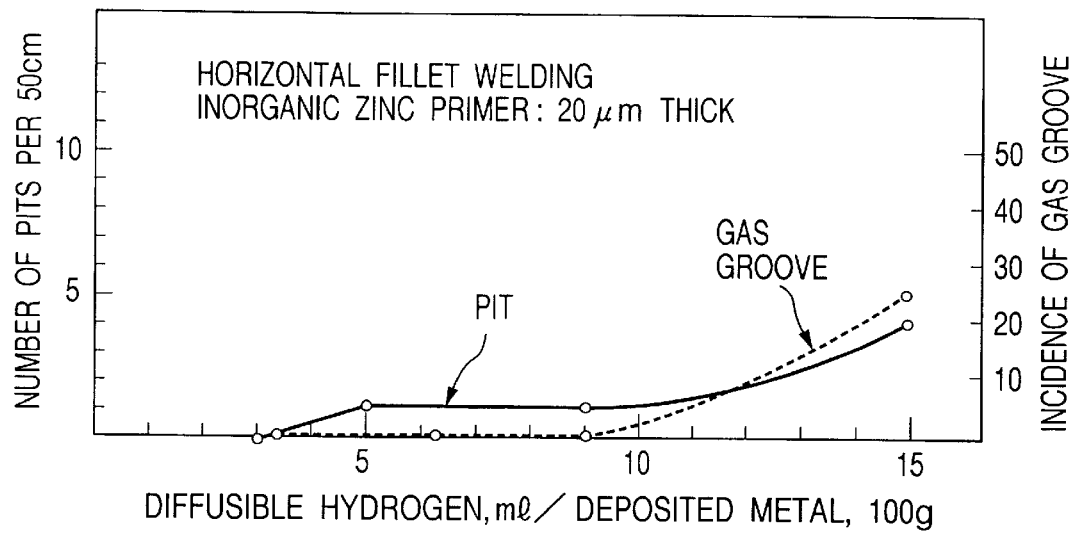

FIG. 7 graphically shows the relationship between the amount of diffusible hydrogen, the number of pits formed, and the incidence of gas grooves.

Figure 8:
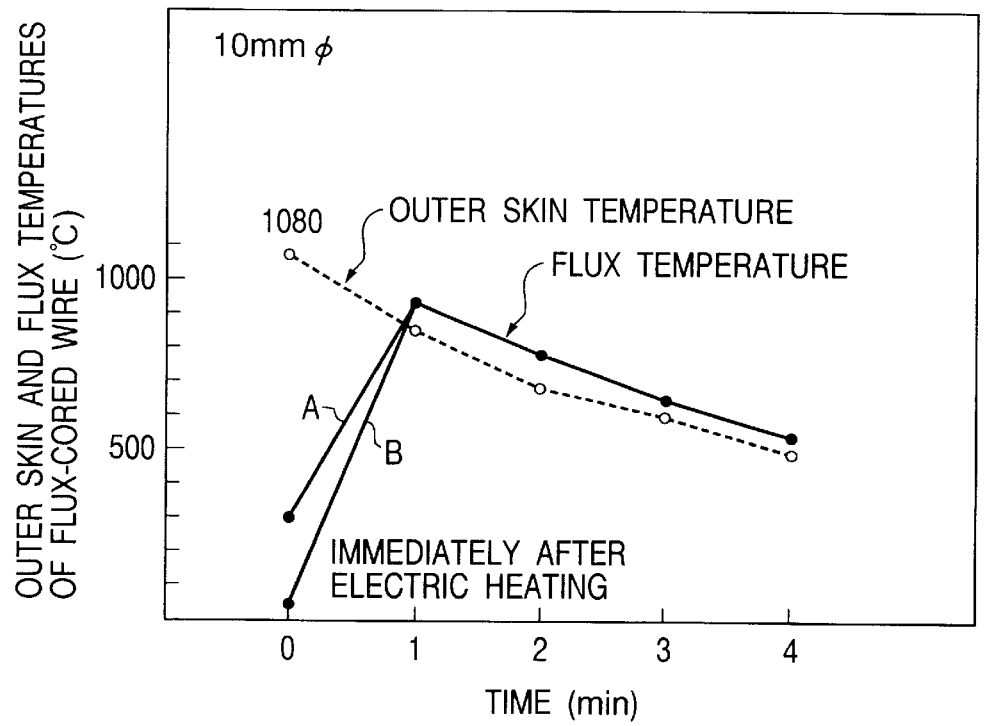

FIG. 8 graphically shows the relationship between the heating time, the temperature of the outer skin of flux-cored wire, and the temperature of flux in Example 1.

FIG. 9 graphically shows the relationship between the heating time, the temperature of the outer skin of flux-cored wire, and the temperature of flux in Example 2.

FIG. 10 graphically shows the relationship between the heating time, the temperature of the outer skin of flux-cored wire, and the temperature of flux in Example 3.

Figure 11:
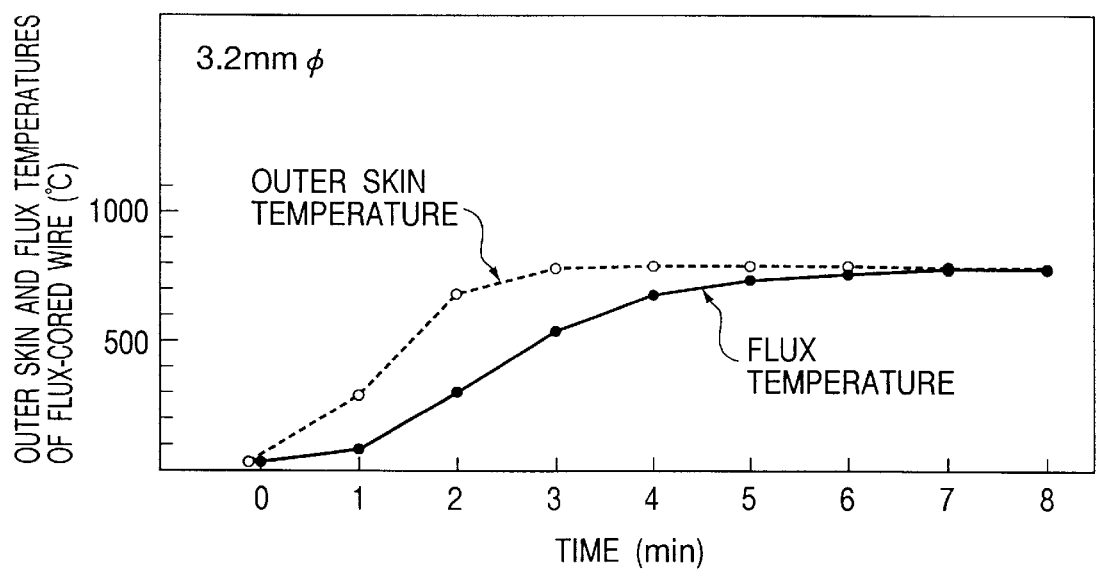

FIG. 11 is another graph showing the relationship between the heating time, the temperature of the outer skin of flux-cored wire, and the temperature of flux in Example 3.

Figure 12:
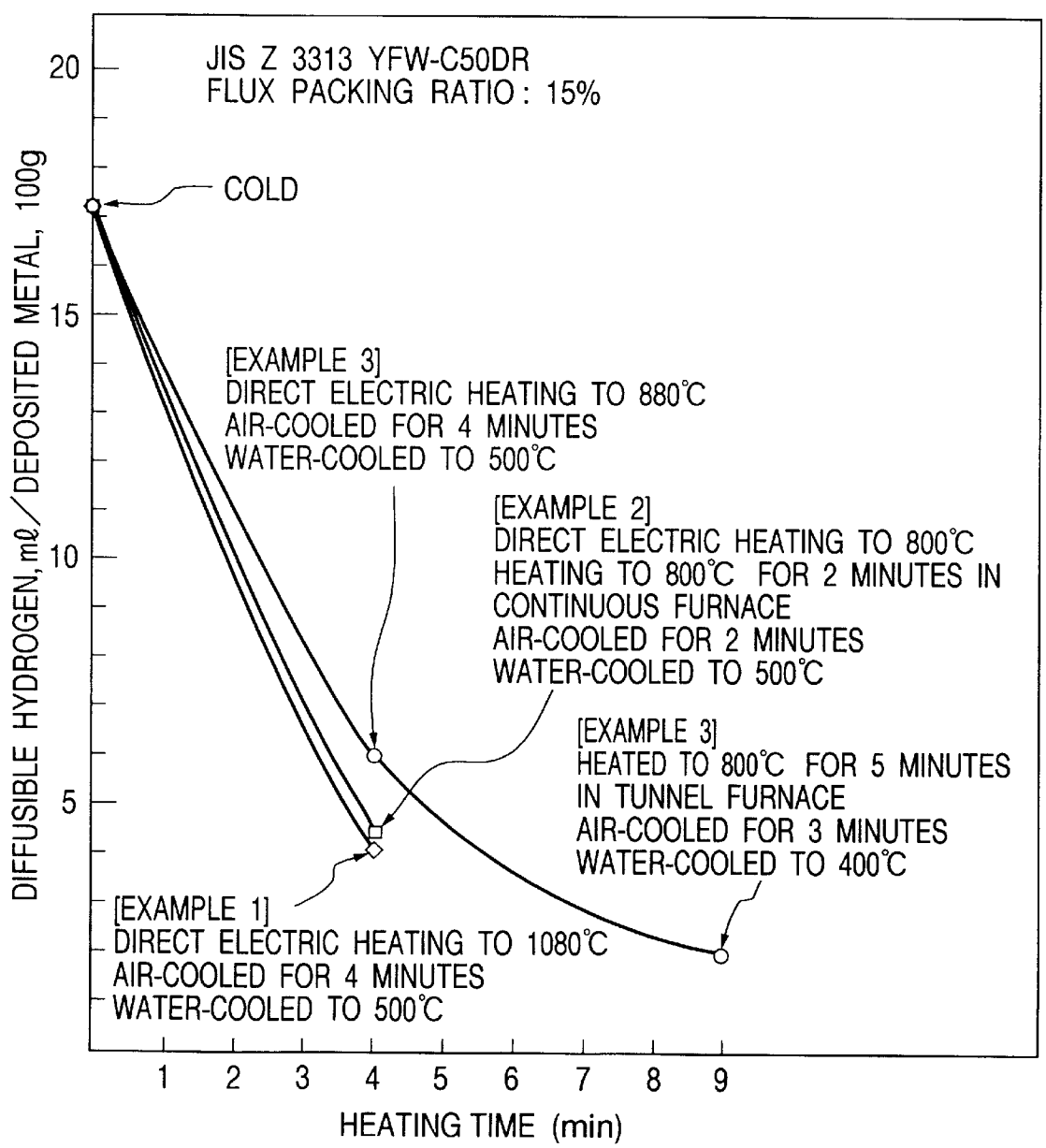

FIG. 12 graphically shows the relationship between the heating time and the amount of diffusible hydrogen in each example.

DESCRIPTION

Now the following paragraphs describe details of this invention be reference to the accompanying drawings.

FIG. 1 illustrates the principle of direct electric heating of wire passed through a ring transformer according to this invention. As shown in FIG. 1, a pair of roll electrode units 2 and 3 are disposed with a given space left therebetween and a wire 1 held between facing roll electrodes 2a and 2b and 3a and 3b that make up the roll units 2 and 3. The running wire 1 travels forward while maintaining contact with the circumferential surfaces of the paired roll electrodes 2a and 2b and 3a and 3b.

A ring transformer 4 is concentrically disposed between the paired roll electrode units 2 and 3 so that the wire passes through an opening therein. This transformer comprises, for example, an iron core made up of hollow square sheets of electrical steel having ideal properties for forming a magnetic path, that are layered to a desired thickness, with a vacant square opening formed in the center. The transformer 4 has a primary coil 5 of long wire wound around each of the four sides positioned 90 degrees apart from the adjoining ones. Both ends of the primary coil 5 are connected to a power supply E. The roll electrodes 2 and 3 are electrically connected by means of a conductive member 6. The connecting ends of the conductive member 6 are slidably held in contact with the roll electrodes through sliders 7.

Now that the cross-sectional area and material of the conductive member 6 can be selected as desired, it is easy to keep the ratio of the electric resistance $R_1$ of the wire heated to the electric resistance $R_2$ of the conductive member as $R_1 >> R_2$. The electric current passing through the circuit rapidly and efficiently heats the wire to as high a temperature as 1100° C. While the incidence of spark generation is low, the power efficiency is as high as 90 to 95 percent as against approximately 50 percent in high-frequency induction heating. Because the impedance of the secondary side can be kept lower than that of the primary side, voltage variations are small. With the voltage of the supplied power consumed for the heating of the wire between the first and second roll electrode units, the first and second roll electrode units have substantially equal electric potentials. Because the first and second roll electrode units can therefore be grounded, electric current does not leak outside from between the first and second roll electrode units. Besides, the roll electrode units spaced not more than 2 to 5 m apart are conducive to the compact construction of the heating device.

This rapid direct electric heating through a ring transformer can be applied for simultaneous or separate attainment of optimum dehydrogenation and outer-skin softening. In a separate process, dehydrogenation heating to between 620° and 1100° C. is done in an earlier stage to decrease the quantity of diffusible hydrogen. Outer-skin softening heating to between 600° and 800° C. done in a later stage controls the hardness of the outer skin (to improve the feed speed and prevent the breaking of the wire) If dehydrogenation in the earlier stage is done on larger-diameter wires that move more slowly, subsequent drawing and surface treatment will suffice to obtain the desired product. Hence, it is preferable to apply dehydrogenation on larger-diameter wires between 8 and 15 mm in diameter.

If dehydrogenation is done in an earlier stage on larger-diameter wires between 8 and 15 mm moving more slowly than thinner ones, welding wires containing not more than 5 ml of diffusible hydrogen can be obtained without requiring any other process than subsequent drawing. Manufacture of ultra-low hydrogen welding wires using bonded flux containing more water than non-bonded flux is inefficient because the excess water must be decreased by applying pre-baking or other intense drying. By contrast, a combination of dehydrogenation on larger-diameter wires between 8 and 15 mm in diameter and subsequent heating on reduced wires 2 to 7 mm in diameter, which is intended mainly for the softening of the outer skin but accomplishes some additional dehydrogenation, permits continuous efficient manufacture of ultra-low hydrogen welding wires containing not more than 3 ml diffusible hydrogen from only lightly dried bonded flux.

FIG. 2 shows the relationship between the hardness of the outer skin of wires 8 to 15 mm in diameter and the outer skin hardness control zone after softening annealing, whereas FIG. 3 shows the relationship between the hardness of the outer skin of wires drawn to 2 to 7 mm in diameter after heating and the outer skin hardness control zone after softening heating. As shown in FIGS. 2 and 3, the stable feed zone differs between wires 8 to 15 mm in diameter and wires 2 to 7 mm in diameter. The wire feeder and the welding point are several meters or tens of meters apart and connected by a flexible conduit. When the flexible conduit is forcibly bent to meet the condition of the work site, as in the welding of bent wiring in a confined space, a great resistance built up between the inner wall of the flexible conduit and the passing wire destabilizes the feed of the wire.

Because the level of resistance varies with the bending condition of the flexible conduit and wire diameter, wires having appropriate skin hardness to meet the condition of the job site must be prepared. As the packing ration increases, the outer skin thickness decreases, as shown in FIG. 3. Wires with an outer skin hardness exceeding 250 Hv tend to break and make it difficult to wrap their end over a spool. This is the bending fracture limit. Wires with an outer skin hardness of 150 Hv or under, on the other hand, tend to buckle between the feed rollers and the flexible conduit or at the entry end of the power supply tip and impair the smoothness of the feed. This is the buckling limit. Hence, the stable feed zone is obtained when the hardness of the outer skin is kept between the bending fracture limit of 250 Hv and the buckling limit of 150 Hv.

FIG. 4 shows the relationship between the heating time and temperature in a process combining direct electric heating and heating in a tunnel furnace. As can be seen, direct electric heating rapidly raises the outer skin temperature to 800° C. Then, the temperature of the portion of the flux in contact with the inner surface of the outer skin rises to 400° C. and further along the flux temperature curve A. By heat conduction through the flux, the temperature in the central portion of the flux rises along the flux temperature curve B with some time lag, reaching substantially the same level as the outer skin temperature in approximately 5 minutes. FIG. 5 shows the relationship between the heating time and temperature in a heating process employing a continuous tunnel furnace. Unlike the case shown in FIG. 4, the outer skin temperature gradually rises to 800° C. in 2 to 3 minutes. The flux temperature also rises slowly to 800° C. in approximately 8 minutes. As is obvious from the above, direct electric heating permits a rapid heating to a high temperature, an in-line continuous heating by directly connecting several processes, and a heating of wires with larger diameters or thinner outer skins, with high thermal efficiency.

FIG. 6 shows the relationship between the quantity of diffusible hydrogen and hydrogen-induced cracking in horizontal and fillet welding. In other words, this figure shows the relationship between the quantity of diffusible hydrogen contained in 100 g deposited metal and the tensile strength of the weld metal. When the content of diffusible hydrogen is 5 ml, the tensile strength of the weld metal drops sharply to 60 kgf/mm$^2$. When the content exceeds 7 ml, the tensile strength falls to 50 kgf/mm$^2$ and the likelihood of hydrogen-induced fracture increases. Accordingly, it is preferable to keep the content of diffusible hydrogen in 100 g deposited metal under 5 ml.

FIG. 7 shows the relationship between the amount of diffusible hydrogen. The number of pits formed, and the incidence of gas grooves (i.e. primer-proof quality). In FIG. 7, the deposited metal is the metal obtained by applying horizontal fillet welding to steel plate coated with a 20 um thick inorganic zinc primer, the amount of diffusible hydrogen is the content in 100 g deposited metal, and the number of pits and the incidence of gas grooves are the values in a 50 cm long weld bead. As shown in FIG. 7, the number of pits and the incidence of gas grooves have a tendency to increase sharply when the content of diffusible hydrogen exceeds 10 ml. To maintain good primer-proof quality, it is thus necessary to keep the content of diffusible hydrogen below 10 ml. Considering the resistance to hydrogen-induced cracking shown in FIG. 6 and the primer-proof quality shown in FIG. 7, it is necessary to keep the content of diffusible hydrogen at least below 7 ml, or preferably below 5 ml. The preferable flux packing ratio for the seamless flux-cored welding wires according to this invention is 10 to 26 percent.

EXAMPLES

Example 1

A 21 mm diameter raw wire filled with flux to 15 percent (by weight) of the internal cavity for seamless flux-cored welding wire according to JIS Z 3313 YFW-C50DR was subjected to a drawing to reduce the diameter to 10 mm so that the internal cavity is filled with flux to 100 percent or more (by bulk density). To perform dehydrogenation, the 10 mm diameter wire was directly electrically heated to 1080° C. at a rate of 72° C. per second by passing the wire, at a speed of 20 m per minute, through a ring transformer disposed between the first and second roll electrode units that are spaced 5 m apart. FIG. 8 shows the relationship between the temperatures of the outer skin and the flux. To be more specific, FIG. 8 shows the relationship between the heating time and the temperatures of the outer skin of the flux-cored wire and the flux. Immediately after electric heating, the outer skin temperature rapidly rose to 1080° C. and the temperature of the portion of the flux in contact with the inner surface of the outer skin rose to 300° C. and further along the flux temperature curve A. By heat conduction through the flux, the temperature in the central portion of the flux rose along the flux temperature curve B with some time lag, reaching approximately 950° C. in 1 minute, as shown in FIG. 8. The heated wire was air-cooled with a coefficient of heat transfer of 50 kcal/m$^2$h°C. for 4 minutes and then water-cooled to below 500° C. by a rapid controlled cooling at a rate of 2.4° C. per second.

The wire was then subjected to a drawing and surface-treatment process to obtain a finished wire 2.4 mm in diameter. The 2.4 mm diameter wire thus obtained was used in welding with a current of 550 amperes at 42 volts, a welding speed of 35 cm per minute, a wire extension of 30 mm, and a carbon dioxide evolution of 30 liters per minute. The resulting content of diffusible hydrogen per 100 g deposited metal determined by gas chromatography was 4.2 ml.

Example 2

A 21.5 mm diameter raw wire filled with flux to 18 percent (by weight) of the internal cavity for seamless flux-cored welding wire according to JIS Z 3313 YFW-C50DR was subjected to a drawing and surface-treatment process to reduce the diameter to 10.5 mm so that the internal cavity is filled with flux to 100 percent or more (by bulk density). To perform dehydrogenation, the 10.5 mm diameter wire was directly electrically heated to 800° C. at a rate of 53° C. per second by passing the wire, at a speed of 20 m per minute, through a ring transformer disposed between the first and second roll electrode units that are spaced 5 m apart. FIG. 9 shows the relationship between the temperatures of the outer skin and the flux. To be more specific, FIG. 9 shows the relationship between the heating time and the temperatures of the outer skin of the flux-cored wire and the flux. Immediately after electric heating, the outer skin temperature rapidly rose to 800° C. and the temperature of the portion of the flux in contact with the inner surface of the outer skin rose to 200° C. and further along the flux temperature curve A. By heat conduction through the flux, the temperature in the central portion of the flux rose along the flux temperature curve B with some time lag, reaching approximately 800° C. in 1 minute, as shown in FIG. 9. The heated wire was further heated at 800° C. for 2 minutes in a directly connected gas or continuous heating furnace, air-cooled with a coefficient of heat transfer of 50 kcal/m$^2$h°C. for 2 minutes and then water-cooled to below 500° C. by a rapid controlled cooling at a rate of 2.5° C. per second. The wire was then subjected to a drawing and surface-treatment process to obtain a finished wire 2.0 mm in diameter. The 2.0 mm diameter wire thus obtained was used in welding with a current of 500 amperes at 38 volts, a welding speed of 35 cm per minute, a wire extension of 25 mm, and a carbon dioxide evolution of 25 liters per minute. The resulting content of diffusible hydrogen per 100 g deposited metal determined by gas chromatography was 4.5 ml.

Example 3

A 21 mm diameter raw wire filled with flux to 12 percent (by weight) of the internal cavity for seamless flux-cored welding wire according to JIS Z 3313 YFW-C50DR was subjected to a drawing to reduce the diameter to 10 mm so that the internal cavity is filled with flux to 100 percent or more (by bulk density). To perform dehydrogenation, the 10 mm diameter wire was directly electrically heated to 880° C. at a rate of 350° C. per second by passing the wire, at a speed of 60 m per minute, through a ring transformer disposed between the first and second roll electrode units that are spaced 2.5 m apart. FIG. 10 shows the relationship between the temperatures of the outer skin and the flux. To be more specific, FIG. 10 shows the relationship between the heating time and the temperatures of the outer skin of the flux-cored wire and the flux. Immediately after electric heating, the outer skin temperature rapidly rose to 880° C. and the temperature of the portion of the flux in contact with the inner surface of the outer skin rose to 200° C. and further along the flux temperature curve A. By heat conduction through the flux, the temperature in the central portion of the flux rose along the flux temperature curve B with some time lag, reaching approximately 800° C. in 1 minute, as shown in FIG. 10. The heated wire was air-cooled with a coefficient of heat transfer of 20 kcal/m$^2$h°C. for 4 minutes and then water-cooled to below 500° C. by a rapid controlled cooling at a rate of 1.6° C. per second. The wire was then drawn to a wire 3.2 mm in diameter which was heated to 800° C. for 5 minutes in a tunnel furnace for outer skin softening and dehydrogenation. FIG. 11 shows the relationship between the temperatures of the outer skin and flux obtained. To be more specific, FIG. 11 shows the relationship between the heating time and the temperatures of the outer skin and flux of the flux-cored welding wire. As shown in FIG. 11, the outer skin temperature rose to 800° C. in 3 minutes. The flux temperature also rose to approximately 800° C. in 6 minutes. The heated wire was then air-cooled again with a coefficient of heat transfer of 80 kcal/m²h°C. for 3 minutes and then water-cooled to below 400° C. by a rapid controlled cooling at a rate of 2.2° C. per second. The wire was then subjected to a drawing and surface-treatment process to obtain a finished wire 1.2 mm in diameter. The 1.2 mm diameter wire thus obtained was used in welding with a current of 270 amperes at 30 volts, a welding speed of 35 cm per minute, a wire extension of 20 mm, and a carbon dioxide evolution of 25 liters per minute. The resulting content of diffusible hydrogen per 100 g deposited metal determined by gas chromatography was 2.1 ml.

FIG. 12 shows the relationship between he heating time and the quantity of diffusible hydrogen in each example. The quantity of diffusible hydrogen in 100 g deposited metal was 4.2 ml in Example 1, 4.5 ml in Example 2, 5.0 ml in the wire directly electrically heated to 880° C. and water-cooled to 500° C. after air-cooling and 2.1 ml in the wire further heated in the tunnel furnace and cooled in Example 3. Obviously, all of the wires prepared by the process of this invention contained much less diffusible hydrogen than the conventional ones that were prepared for the purpose of comparison without heating. The processes according to this invention thus permit efficient manufacture of low-hydrogen flux-cored welding wires with excellent cracking resistance and primer proof quality suited for the welding of high-tensile and structural steels by reducing the content of diffusible hydrogen.

What is claimed is:

1. A process for manufacturing seamless flux-cored welding wire by dehydrogenating a wire prepared by packing flux in a metal tube by heating at a high temperature comprising the steps of directly electrically heating a straight wire 8 to 15 mm in diameter, which comprises a metal tube packed with flux, to a temperature between 620° and 1100° C. by passing the wire through a first and a second pairs of roll electrodes spaced 2 to 5 m apart along the path of wire travel and a ring transformer disposed therebetween, cooling the heated wire to a temperature not higher than 500° C. with a coefficient of heat transfer not higher than 250 kcal/m²h°C., and drawing the cooled wire to a diameter between 0.8 and 4 mm, the weld formed with the welding wire thus obtained containing not more than 5 ml of diffusible hydrogen per 100 g deposited metal.

2. A process for manufacturing seamless flux-cored welding wire by dehydrogenating a wire prepared by packing flux in a metal tube by heating at a high temperature comprising the steps of directly electrically heating a straight wire 8 to 15 mm in diameter, which comprises a metal tube packed with flux, to a temperature between 620° and 1100° C. by passing the wire through a first and a second pairs of roll electrodes spaced 2 to 5 m apart along the path of wire travel and a ring transformer disposed therebetween, heating the wire at a temperature between 600° and 800° C. in a gas or electric heating furnace, cooling the heated wire to a temperature not higher than 500° C. with a coefficient of heat transfer not higher than 250 kcal/m²h°C., and drawing the cooled wire to a diameter between 0.8 and 4 mm, the weld formed with the welding wire thus obtained containing not more than 5 ml of diffusible hydrogen per 100 g deposited metal.

3. A process for manufacturing seamless flux-cored welding wire by dehydrogenating a wire prepared by packing flux in a metal tube by heating at a high temperature comprising the steps of directly electrically heating a straight wire 8 to 15 mm in diameter, which comprises a metal tube packed with flux, to a temperature between 620° and 1100° C. by passing the wire through a first and a second pairs of roll electrodes spaced 2 to 5 m apart along the path of wire travel and a ring transformer disposed therebetween, cooling the heated wire to a temperature not higher than 500° C. with a coefficient of heat transfer not higher than 250 kcal/m²°C., and drawing the cooled wire to a diameter between 2 and 7 mm, heating the drawn wire to a temperature between 600° and 800° C., cooling the heated wire to a temperature not higher than 500° C. with a coefficient of heat transfer not higher than 250 kcal/m²h°C., and drawing the cooled wire to a diameter between 0.8 and 4 mm, the weld formed with the welding wire thus obtained containing not more than 3 ml of diffusible hydrogen per 100 g deposited metal.

* * * * *